US005160040A

United States Patent [19]

Odawara et al.

[11] Patent Number: 5,160,040

[45] Date of Patent: Nov. 3, 1992

[54] CLEANING SYSTEM FOR USE IN TREATMENT OF EXCESS PAINT

[75] Inventors: Shiro Odawara, Oomiya; Keiichi Ito, Tokyo; Kazushi Kobayashi, Asaka, all of Japan

[73] Assignee: Taikisha Ltd., Tokyo, Japan

[21] Appl. No.: 728,563

[22] Filed: Jul. 11, 1991

[30] Foreign Application Priority Data

Jul. 17, 1990 [JP] Japan ................................ 2-188972

[51] Int. Cl.[5] ............................................ B01D 36/00

[52] U.S. Cl. ................................ 210/167; 210/195.1; 210/196; 210/257.1; 210/259; 210/298

[58] Field of Search .................... 210/167, 172, 195.1, 210/196, 257.1, 258, 259, 297, 298, 300, 307, 153, 387

[56] References Cited

U.S. PATENT DOCUMENTS

| | | | |
|---|---|---|---|
| 2,981,525 | 4/1961 | Umbricht | 210/167 |
| 3,341,016 | 9/1967 | Paasche | 210/307 |
| 3,923,658 | 12/1973 | Lancaster | 210/167 |
| 4,469,595 | 9/1984 | Napadow | 210/167 |
| 4,773,992 | 9/1988 | Dietrich et al. | 210/167 |
| 4,818,388 | 4/1989 | Morioka et al. | 210/195.1 |
| 4,931,176 | 6/1990 | Guinard | 210/195.1 |

FOREIGN PATENT DOCUMENTS 2334370 1/1975 Fed. Rep. of Germany .

*Primary Examiner*—Stanley S. Silverman
*Assistant Examiner*—Christopher Upton
*Attorney, Agent, or Firm*—Webb, Burden, Ziesenheim & Webb

[57] ABSTRACT

A cleaning system for use in treatment of excess paint is disclosed. The system includes a work area for cleaning excess paint by trapping the paint in a cleaning liquid, a collecting gutter being provided in a floor of said work area for introducing the cleaning liquid containing the excess paint in the form of paint sludge. The collecting gutter incorporates a filter for filtering the cleaning liquid introduced into this gutter. The system further includes a collecting device for collecting the paint sludge trapped by the filter.

12 Claims, 7 Drawing Sheets

CLEANING SYSTEM FOR USE IN TREATMENT OF EXCESS PAINT

BACKGROUND OF THE INVENTION

1. Field of the Invention

The present invention relates to a cleaning system for use in treatment of excess paint generated from a large painted object such as an aeroplane, and more particularly to a system of the above type including a collecting gutter for collecting cleaning liquid containing paint sludge of excess paint to be eliminated, the gutter being installed in a floor surface of a painting work area. .

2. Descriptionof the Related Art

With the above-described cleaning system for use in treatment of excess paint, the system is generally accompanied by a sludge separating device for separating sludge from the sludge-containing cleaning liquid collected at the collecting gutter installed in a floor face of a painting work area. Conventionally, this sludge separating device is installed at a sited specially reserved for this device and outside the system area.

Needless to say, this is not convenient in terms of economy of system installing space.

In particular, where the system is used for treatment of excess paint generated from painting operation of such a large object as an aeroplane, a great amount of cleaning liquid is used. Therefore, for treating such great amount of liquid, the sludge separating device tends to be physically large, thus presenting even more serious problem of device installing space.

Thus, the primary object of the present invention is to provide an improved, i.e. more compact cleaning system for use in treatment of excess paint through rationalization of a sludge separating section of the system used for separating excess paint sludge from cleaning liquid.

SUMMARY OF THE INVENTION

For accomplishing the above-noted object, a cleaning system for use in treatment of excess paint, according to the present invention, comprises:

a work area for cleaning excess paint by trapping the paint in a cleaning liquid, a collecting gutter being provided in a floor of the work area for introducing the cleaning liquid containing the excess paint in the form of paint sludge;

said collecting gutter including a filter for filtering the cleaning liquid introduced into the gutter; and a collecting device for collecting the paint sludge trapped by the filter.

Functions and effects of the above-described construction will be described next.

With the above-described construction in operation, as the filter incorporated in the collecting gutter filters the sludge-containing cleaning water being introduced into the gutter, the paint sludge is separated and eliminated from the cleaning liquid at this stage of introduction of the cleaning liquid into the collecting gutter. And, thus-trapped sludge is collected by the collecting device.

Accordingly, the collecting gutter installed in the floor of the work area is effectively utilized for space economy; and the paint sludge contained in the cleaning liquid is eliminated and collected when the liquid is introduced into the gutter. Therefore, it becomes unnecessary to reserve special space for installing a sludge separating device. Moreover, even when the separating device is installed outside the system area, this separating device can be of a compact type having limited treatment capacity, since much of the paint sludge has already been eliminated through the filter at the gutter before the sludge-containing liquid reaches this separating device.

As described above, according to the characterizing features of the present invention, it has become possible to eliminate or at least minimize the space specially reserved for installing a sludge separating device outside the system, whereby the entire system can be formed very compact.

Preferably, the collecting device is constructed as a filter conveyor operable to collect the sludge through movement of the filter conveying the trapped sludge thereon.

With this additional feature, the filter per se is utilized also as a filter conveying-collecting means. Therefore, compared with the conventional arrangements where e.g. a scraper member is used for scraping and eliminating the sludge off the filter or where a movable suction member is used for sucking the sludge off the filter during movement of the suction member along the filter, the system having the above additional feature of the invention can be formed very compact and simple.

Preferably, the system of the present invention further comprises:

a cleaning device for cleaning the cleaning liquid collected at the collecting gutter; and a recycling passage for recycling the cleaning liquid cleaned by the cleaning device to an upstream end of the collecting gutter.

The functions and effects of the above additional features will be described.

Of the paint sludge contained in the cleaning liquid introduced into the collecting gutter, a portion of this sludge un-trapped by the filter will not smoothly flow in the collecting gutter and will tend to remain or accummulate at the bottom of this gutter. Then, this inconvenience can be effectively avoided by flushing effect of the cleaning liquid fed, i.e. recycled to the upstream end of the gutter. As a result, the collecting gutter will require a cleaning maintenance operation with lower frequency.

Furthermore, because once-collected cleaning liquid is recycled for re-use, the system running costs will be reduced, as compared with the conventional arrangement where fresh cleaning water is be supplied continuously from the upstream end of the gutter.

Further and other objects, features and effects of the invention will become more apparent from the following more detailed description of the embodiments of the invention with reference to the accompanying drawings.

BRIEF DESCRIPTION OF THE DRAWINGS

Accompanying drawings FIGS. 1 thorugh 11 illustrate preferred embodiments of a system according to the present invention; in which.

DESCRIPTION OF THE PREFERRED EMBODIMENTS

Preferred embodiments of a cleaning system for use in treatment of excess paint, relating to the present invention, will now be described in details with reference to the accompanying drawings.

Figure 1:
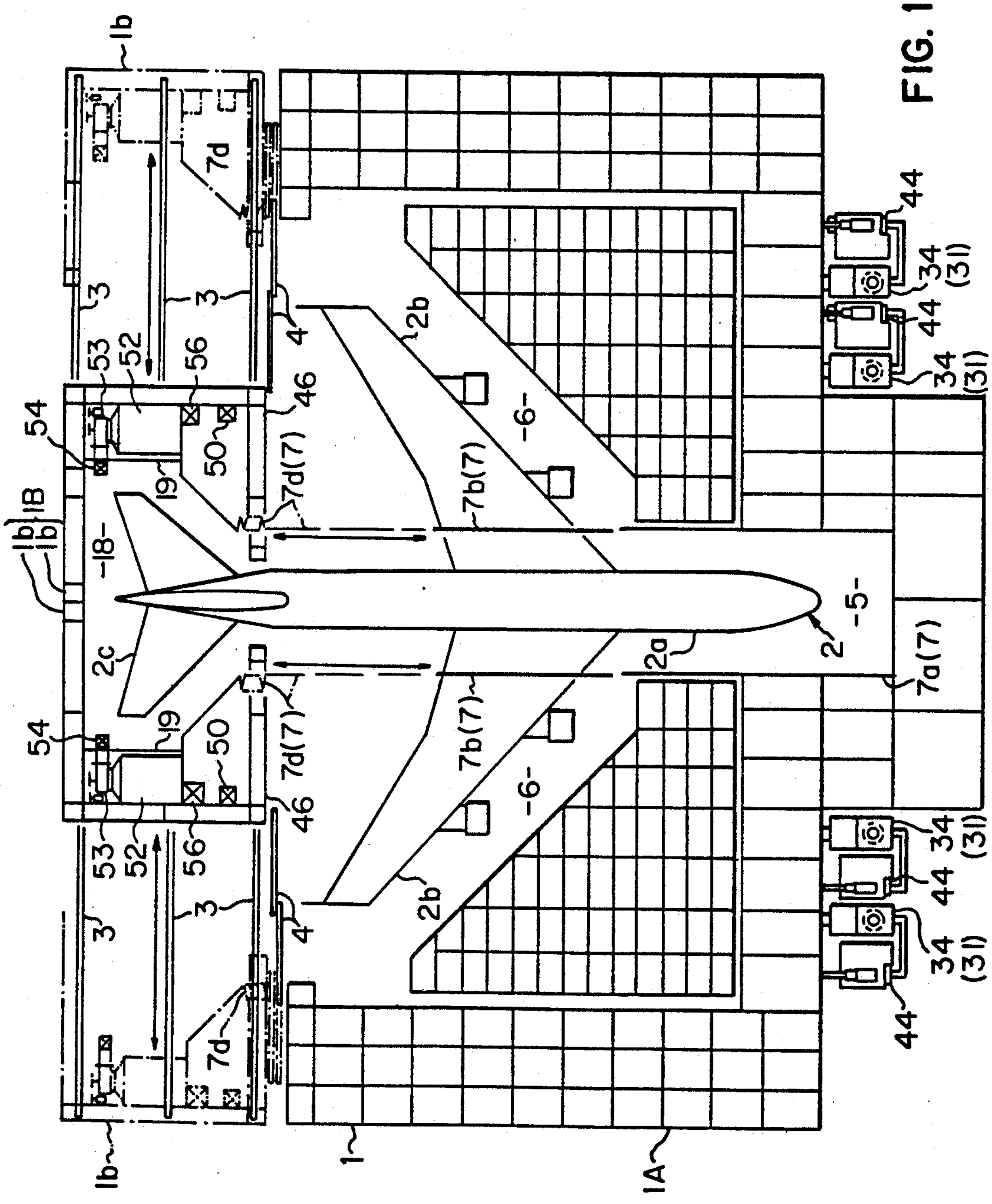
FIG. 1 is a plane view showing a structure of an aeroplane hangar.
Figure 2:
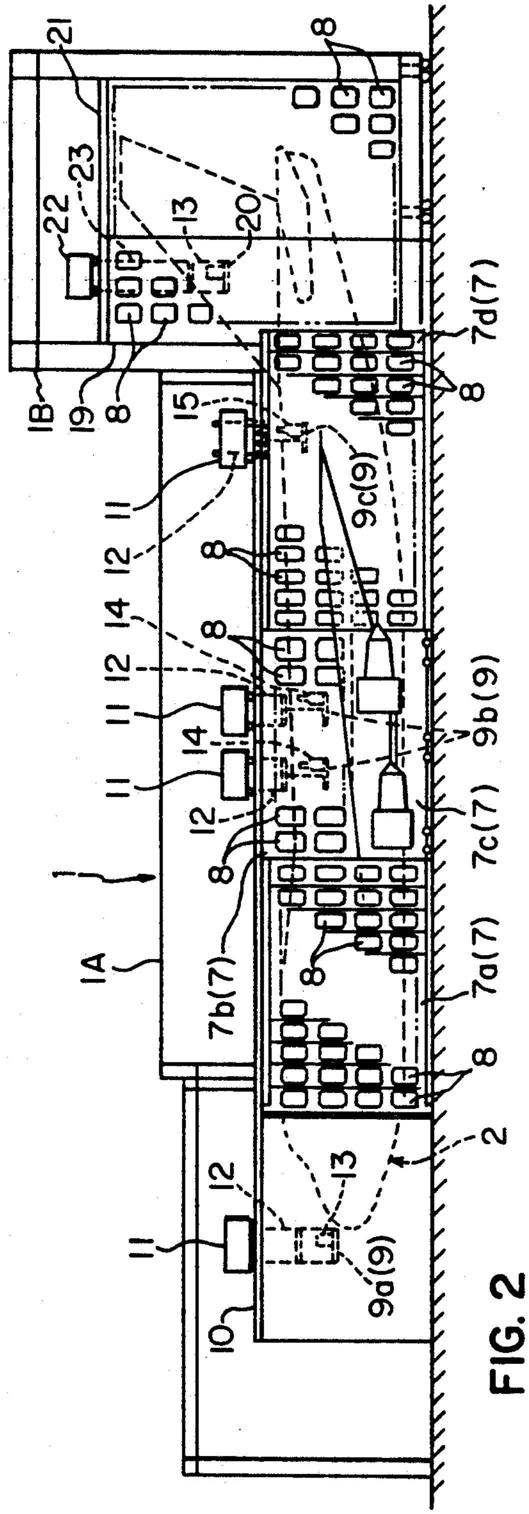
FIG. 2 is a vertical section.

Referring to FIG. 1, a reference numeral 1 denotes a hangar for accommodating an aeroplane 2 to effect works such as re-painting job on this aeroplane 2. This hangar 1 is so designed as to introduce the aeroplane 2 from its nose.

More particularly, the hangar 1 includes a main area 1A for receiving a fuselage 2a and a main wing 2b of the aeroplane 2 and an empennage area 1B disposed adjacent an entrance to the main area 1A so as to receive an empennage 2c of the aeroplane 2. The main wing area 1A has a greater width than the empennage area 1B for the purpose of accommodating the main wing 2b. Whereas, the empennage area 1B has a greater height than the main area 1A so as to accommodate the vertically extending empennage 2c.

Further, the empennage area 1B has a shorter width than the main area 1A and is divided widthwise into two sections 1b, 1b for allowing introduction of the fuselage 2a and the main wing 2b into the main area 1A. These sections 1b, 1b are movably combined into the one area 1B between an accommodating position (denoted with a solid line) where the sections 1b, 1b become united for accommodating the empennage 2c and a retracted position (denoted with an detached line) where the sections 1b, 1b are separated from each other for allowing therethrough the introduction of the fuselase 2a and the main wing 2b into the main area 1A.

A reference numeral 3 denotes a guide mechanism for guiding the above-described movements of the sections 1b. Further, a reference numeral 4 denotes an auxiliary gate for allowing entrance and exit of the main wing 2b into and out of the main area 1A.

With the above-described construction of the main area 1A and the empennage area 1B, compared with the conventional construction where the entire hangar 1 has the long width corresponding to the main wing 2b and the long height corresponding to the empennage, it becomes possible to reduce the construction costs of the entire hangar 1 and also to reduce the installation and running costs of the ventilation and air conditioning system inside the hangar 1.

In the main area 1A of the hangar 1, there is provided a partition wall 7 for sectioning this area 1A into a fuselage work area 5 for works on the fuselage 2a accommodated therein (including also the nose of the aeroplane, in this particular embodiment) and a main-wing work area 6 for works on the main wing 2b. As this partition wall 7 sections the area 1A into the fuselage work area 5 and the main-wing work area 6, it is possible to simultaneously effect different works at the respective areas 5, 6 without the work at one area disadvantageously affecting that at the other area.

The partition wall 7 is movable between a partitioning position (the position shown in the drawings) where the wall 7 is positioned across the fuselage 2a through the entire length thereof and a retracted position where the wall 7 is retracted for allowing unobstructed entrance and exit of the aeroplane 2. More particularly, for this movability, the partition wall 7 is divided into a plurality of wall portions 7a, 7b, 7c and 7d, with these portions being movable independently of each other.

More particularly, the top wall portion 7a positioned across the fuselage 2a forwardly of the main wing 2b is constructed as a foldable structure, so that the portion 7b has its sides movable as being guided by a pair of upper and lower rail type guide mechanisms between a partitioning position where the portion 7a is folded out adjacent the fuselage 2a and a predetermined retracted position at the end of the main area 1A where the portion 7a is folded in. Further, the central upper wall portion 7b positioned across the fuselage 2a upwardly of the main wing 2b has its sides movable as being guided by a lift mechanism between a partitioning position where the portion 7b is lowered by the lift mechanism to be aside the fuselage 2a and an upper predetermined retracted position where the portion 7b is lifted up by the lift mechanism.

Further, the central lower portion 7c positioned across the fuselage 2a downwardly of the main wing 2b has right and left sides thereof independently movable by means of e.g. casters each between the partitioning position and the retracted position. The rear wall portion 7d positioned across the fuselage 2a rearwardly of the main wing 2b has a foldable construction guided on upper and lower rail type guide mechanisms. That is, at the partitioning position, right and left sides of this rear wall portion 7d are folded out to partition the rear sides of the fuselage 2a. On the other hand, at the retracted position, the right and left sides of the rear wall portion 7d are folded in to a predetermined storing position adjacent the empennage work area 1B. The right and left sides of this rear wall portion 7d are independently movable. Also, the retracting movement of this rear wall portion 7d, at its retracted, i.e. folded storing, position, is associated with the movement of the respective sections 1b to their retracted positions in the empennage area 1B.

Incidentally, at the respective portions of the partition wall 7, there are provided a plurality of transparent glass windows 8 for allowing entrance of light into the hangar 1 and allowing also monitoring of the works at the fuselage work area 5 from the outside.

In the fuselage work area 5, separately of the partition wall 7 at its partitioning position, there are provided working tables 9 movable inside this fuselage work area 5, so that various works on the fuselage 2a can be effected efficiently by the free movements of the working tables 9.

Referring more particularly to the movable construction of the working tables 9, at a ceiling portion of the hangar 1 and at positions corresponding to side edges of the fuselage work area 5, there are provided a pair of rails 10 extending along the entire length of the fuselage work area 5 and a plurality of transverse frames 11 disposed between the rails 10 and movable on these rails 10 along the longitudinal direction of the fuselage 2a. Further, from each transverse frame 11, a pair of vertically expandable frames 12 are continuously extended for the right and left sides of the fuselage 2a, and the working tables 9 are attached respectively to lower ends of these vertically expandable frames 12.

In operation, each working table 9 is moved longitudinally of the fuselage 2a as being guided on the rails 10 of the transverse frame 11. Also, the table 9 is moved vertically of the fuselage 2a as being guided by expanding and contracting motions of each vertically expandable frame 12. Further, the table 9 is moved across the width of the fuselage 2a through the movements of the expandable frame 12 relative to the transverse frame 11.

As described above, since a plurality of the transverse frames 11 are provided and also a plurality of the working tables 9 are dispersed along the length of the fuselage 2a, various works on the fuselage 2a can be effected independently at the further sectioned work zones sectioned in the fuselage work area 5 along the length of the fuselage 2a.

Of the working tables 9 installed in the fuselage work area 5, a pair of working tables 9a positioned beside the nose of the aeroplane 2 mount painting machines 13 (these tables 9a can also mount a one-hand robot type automatic painting machine to be described later) with which maintenance workers effect manual painting operations on the fuselage 2a. Further, each of the above working tables 9a includes a working space for allowing the maintenance worker to effect the manual work. On the other hand, two working tables 9b, which are placed at longitudinally intermediate positions relative to the fuselage 2a, each mounts a one-hand robot type automatic painting machine 14 for effecting automatic painting operation on the side peripheral faces of the fuselage 2a and also a working space for the worker to effect other works.

Further, a working table 9c placed adjacent a side of the empennage mounts also a one-hand robot type automatic painting machine 15 for effecting automatic painting operation on an upper peripheral face of the fuselage 2a and also a working space for the worker to effect other works.

Figure 9:
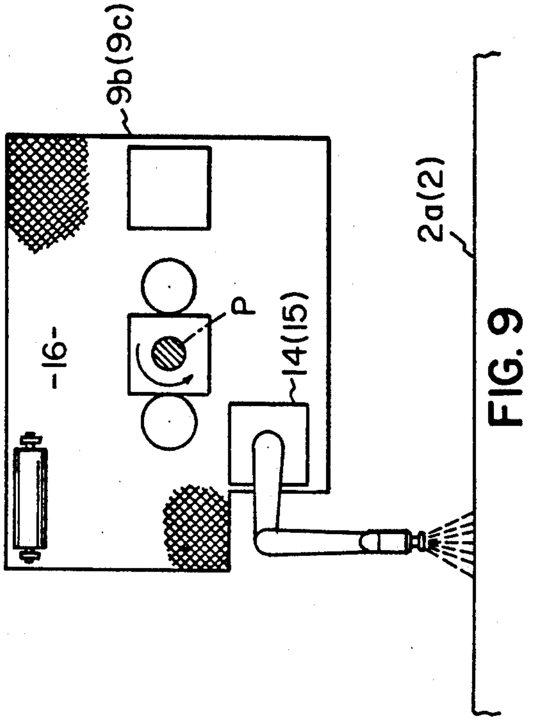
FIGS. 8 and 9 are plane views illustrating uses of working tables inside the hangar.
Figure 8:
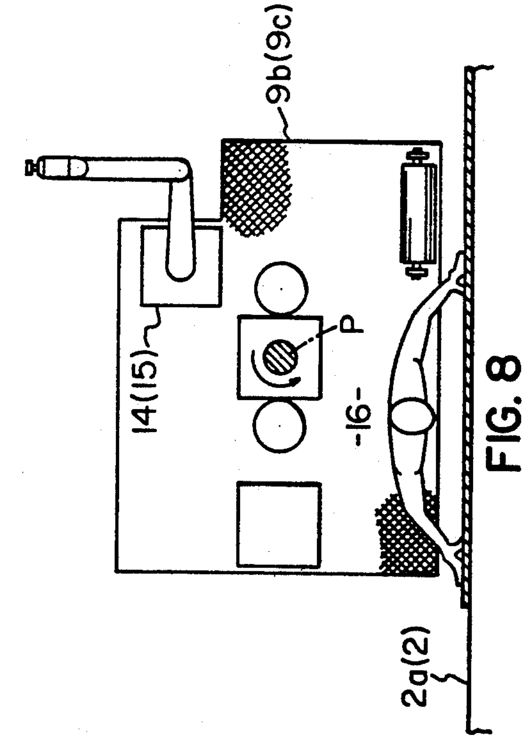

Referring more particularly to the working tables 9b, 9c mounting the automatic, side painting machine 14 and the automatic, top painting machine 15, as illustrated in FIGS. 8 and 9, the machines 14, 15 and the working spaces 16, 16 are disposed side by side on the working tables 9b, 9c, respectively. Further, these working tables 9b, 9c are so attached to the vertically expandable frames 12, 12 that the tables 9b, 9c are selectably positioned through pivotal movement of the tables 9b, 9c about a central vertical axis P between an automatic painting position (shown in FIG. 9) where the side adjacent the automatic painting machine 14 (15) is oriented toward the fuselage 2a and a manual working position (shown in FIG. 8) where the other side adjacent the working space is oriented toward the fuselage 2a. Accordingly, during an automatic painting opertion, the supervising worker standing at the working space 16 will not interfere with the automatic painting operation of the automatic painting machine 14 (15). Similarly, during a manual work, the worker can efficiently effect the work without being interfered with by the presence of the automatic painting machines 14, 15.

In the main-wing work area 6, there are provided a floor-moving type working tables 17 movable on the floor of this work area 6. These working tables 17 mount various kinds of work devices, so that various works such as maintenance of an aeroplane engine and painting works can be effected on these working tables 17.

Further, each of these working tables 17 installed in the main-wing work area 6 has a lift mechanism for allowing adjustment of height of the table 17 depending on the work to be effected thereon.

In the empennage area 1B, there are installed inner walls 19 for surrounding the empennage work area 18 adjacent the empennage 2c accommodated therein. Further, there are provided working tables 20, which are movable in this empennage area 1B, on the opposed sides of the empennage. These working tables 20 include various painting devices 13 for effecting manual painting operations on the empennage 2c and working spaces for the workers to effect other works on the empennage 2c.

The moving construction of the working tables 20 in the empennage area 18 is substantially the same as that employed for moving the working tables 9 of the fuselage area 5. That is, vertically expandable frames 23 are extended from a pair of right and left transverse frames 22 movable along the longitudinal direction of the fuselage 2a, so that the expandable frames 23 can freely move along the width of the fuselage 2a. And, the working tables 20 are attached respectively to lower ends of these vertically expandable frames 23.

The right and left inner walls 19 for surrounding the empennage area 18 and the right and left working table moving mechanisms 20, 21, 22, 23 extending from the rails 21 to the working tables 20 are provided separately in the right and left sections 1b. Then, for allowing movement of the fuselage 2a and the main wing 2b in and out of the main area 1A, these right and left inner walls 19 and the working table moving mechanisms 20, 21, 22 and 23 are moved together with the respective sections 1b.

Figure 10:
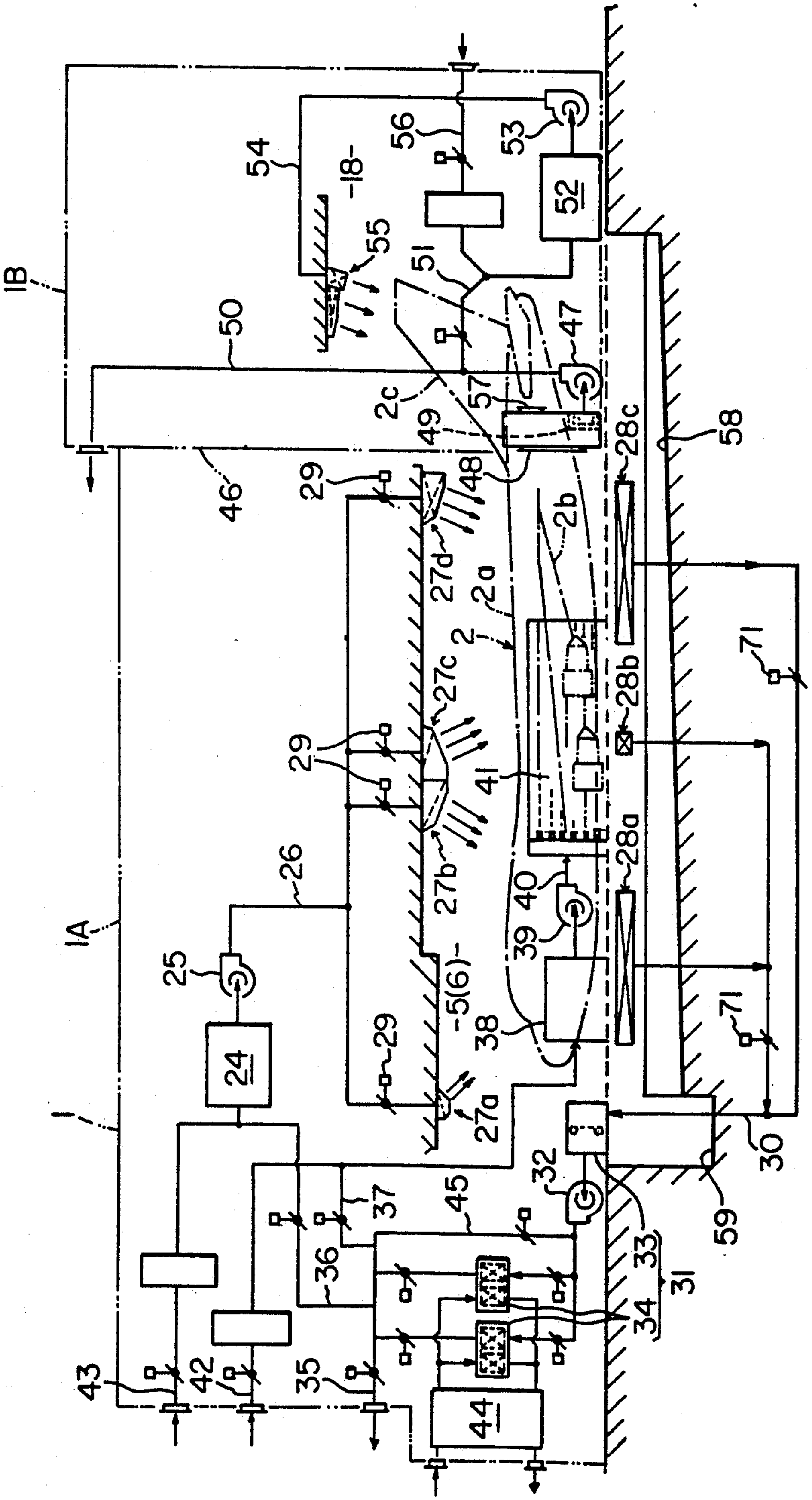
FIG. 10 is a system view of an air ventilation system.

Next, a ventilation and air conditioning system for the fuselage work area 5 will be described with reference to FIG. 10. As shown, a main air conditioning device 24 is provided for cleaning and conditioning the temperature of air to be fed to the fuselage work area 5. At the ceiling portion corresponding to the fuselage work area 5, there are arranged, along the length of the fuselage 2a, a plurality of fuselage air vent openings 27a, 27b, 27c and 27d for receiving the air from the main air conditioning device 24 to feed it into the fuselage work area 5 through air feed fans 25 and air feed passages 26. On the other hand, at the floor portion corresponding to the fuselarge work area 5, there are provided floor air inlet openings 28a, 28b and 28c at positions extending along the peripheral edge of the fuselage work area 5 and adjacent opposed ends of the fuselage 2a and at a position corresponding to the longitudinal center of the fuselage 2a, respectively.

In operation, the dust-eliminated and temperature-conditioned air is fed through the fuselage air vent openings 27a, 27b, 27c and 27d disposed at the ceiling zone and by the air sucking function of the openings 28a, 28b and 28c, the air is forcibly exhausted into these air inlet openings 28a, 28b and 28c disposed at the floor zone together with harmful substance (e.g. spray mist, solvent gas and dust) generated inside this fuselage work area 5. In short, according to this air conditioning system, there is forcibly generated the downward air flow inside the fuselage work area 5, which is partitioned from the main-wing work area 6 by means of the partition wall 7 so as to avoid disadvantageous inflow of the harmful substance into the latter area 6. Consequently, the system can effectively achieve improvement of the working environment inside the fuselage work area 5.

Further, the working tables 9 disposed in this fuselage work area 5 are movable in contrast with the conventional system where the tables have a vertically multistage construction extending through the entire length of the fuselage *2a*. This movable construction is advantageous for preventing the above-described forcible air flow from being interfered with by the presence of these working tables 9, whereby the system can further improve the working environment of the fuselage work area 5 in this respect.

The air vent openings 27*a*, 27*b*, 27*c* and 27*d* and the air inlet openings 28*a*, 28*b* and 28*c* are switchable, by remote control operations on a dumper 29 incorporated in the air feed passage 26 and a further dumper 71 incorporated in the air exhaust passage 30, between a condition where the vent openings 27*a*, 27*b* and the inlet openings 28*a* and 28*b* positioned forwardly in the longitudinal direction of the fuselage 2*a* are used for the air venting and air sucking actions respectively and a further condition where the other vent openings 27*c* and 27*d* and the other inlet opening 28*c* are used for these actions respectively. With this arrangement, the system can further effectively improve the working environment of the fuselage work area 5 by utilizing the forcible, i.e. push-pull air flow while minimizing the area of necessary air conditioning, so that the system can save consumption of the energy needed for the air conditioning operation. This, in turn, means that the system can be formed compact and of a smaller capacity for achieving the same air conditioning effect.

For conditioning the air of the main-wing work area 6, there is provided an air recycling device 31 for cleaning the exhaust air from the fuselarge work area 5 and then feeding this cleaned air to the main-wing work area 6. More particularly, the air recycling device 31 consists essentially of a dust eliminating device 33 for eliminating dust from the exhaust air introduced from the fuselage work area 5 through the air vent openings 28*a*, 28*b* and 28*c* by means of an air exhaust fan 32 and of a rotary adsorbing/desorbing type air disposing device 34 for separating and eliminating permeable harmful substance such as solvent gas still contained at the air from the dust eliminating device 33.

For utilizing the air cleaned by the recycling device 31 as the air to be fed to the main-wing work area 6, the cleaned air is divided into three air flows. That is, one of these air flows is exhausted, as cleaned exhaust air, out of the hangar 1 through the air exhaust passage 35. Another air flow is recycled to the main air conditioning device 24 described hereinbefore. And, the other air flow is guided to a main-wing area air conditioning device 38 through a relay passage 37, so that this air conditioning device 38 again eliminates remaining dust from and conditions the temperature of this air flow portion to feed it as ventilation air to main-wing area air vent openings 41 through an air feed passage 40 by means of a further air feed fan 39.

The main-wing air conditioning device 38 receives, in addition to the cleaned air from the recycling device 31, fresh ambience air introduced through an ambience air inlet passage 42, with these airs being combined together and the device 38 effects the dust eliminating operation and the temperature condition's operation on this combined air flow to feed it to the main wing work area 6. As described above, the exhaust air from the fuselage work area 5 is cleaned by the recycling device 31 and this cleaned air is utilized as a part of the air to be fed to the main wing work area 6. Accordingly, the system can effectively utilize the heat (cold heat in case the main air conditioning device 24 cools the air, or hot heat in case the conditioning device 24 warms the air) retained in the exhaust air from the fuselage work area 5, thus saving consumption of the energy needed for conditioning the temperature of the air to the main wing work area 6 by an amount corresponding to the amount of heat retained in the exhaust air. Consequently, the system can employ a compact and small capacity conditioning device as the main wing area air conditioning device 38.

Moreover, the main air conditioning device 24 receives, in addition to the cleaned air flow portion from the recycling device 31, fresh ambience air introduced through an ambience air inlet passage 43, with the airs being combined together, so that the main air conditioning device 24 effects dust eliminating operation and the temperature conditioning operation on this combined air flow. That is, the main conditioning device 24 can effectively utilize the exhaust air fed after cleaning from the recycling device 31 as a portion of the air to be fed to the fuselage work area 5. As a result, compared with the conventional system which conditions the entire amount of ambience air for feeding it to the fuselage work area 5, the system of the present invention can effectively utilize the heat retained in the exhaust air from the main wing work area 6, thus saving consumption of the energy needed for conditioning the temperature of the air to the fuselage work area 5 by an amount corresponding to the amount of heat retained in the exhaust air. Consequently, the system can employ a compact and small capacity conditioning device as the main wing area air conditioning device 38.

The main-wing area air vent openings 41 for feeding to the main wing work area 6 the air dust-eliminated and temperature-conditioned through the main wing area air conditioning device 38 are so arranged as to vent the air with rearward or obliquely rearward orientation towards the main wing 2*b* from the front portion of the main wing 2*b* and through the entire width of the main wing 2*b*. Accordingly, these air vent openings 41 can feed the air only to the vicinity around the main wing in a concentrated manner. As a result, in this main wing work area 6 too which is larger than the fuselage work area 5, the system can effectively improve the working environment for the workers engaged in various works on the main wing 2*b* with very small amount of air flow.

A reference numeral 44 in the drawings denotes a catalytic combustion device for incinerating the desorbed harmful substance such as the solvent gas which has been separated from the exhaust air through the rotary adsorbing/desorbing type air treating device 34 and been combined with a high-temperature air for desorption.

A reference numeral 45 denotes a bypass passage for the rotary adsorbing/desorbing type air treating device 34. A portion of the dust-eliminated air from the dust eliminating device 33 passes through this bypass passage 45.

A further partitioning wall 46 is provided for partitioning between the main area 1A and the empennage area 1B; and this partitioning wall 46 defines a main-wing area air inlet opening 48 for forcibly introducing the air of the main wing work area 6 by means of an air exhaust fan 47. In operation, the rearward air outlet from the main-wing air vent openings 41 and the air inlet through the above-described main-wing area air inlet opening 48 are combined to smoothly flow the ventilation air around the main wing 2*b*. With this, the system can effectively improve the working environment for those workers engaged in the works on the main wing 2*b*.

For conditioning the air to the empennage work area 18, there is provided a further air recycling device 49 for cleaning the exhaust air from the main wing work area 6 and then feeding it to the empennage work area 18. More specifically, as this recycling device 49, there is provided in the empennage area 1B a dry filter device 49 for cleaning by filtering the exhaust air from the main-wing work area 6 introduced through the main-wing area air inlet opening 48.

A portion of the cleaned air cleaned by this dry filter device 49 is exhausted out of the hangar through an empennage area air exhaust passage 50. The remaining portion of the cleaned air is guided through a relay passage 51 to an empennage area air conditioning device 52, which again eliminates dust from and conditions the temperature of the air to feed it through an air feed fan 53 and an air feed passage 54 to an empennage area air vent opening 55.

The empennage area air conditioning device 52 receives, in addition to the portion of the cleaned air from the dry filter device 49, fresh ambience air introduced through an ambience air inlet passage 56 and then effects the dust eliminating operation and the temperature conditioning operation on these air combined. Thereafter, the device 52 feeds the conditioned air to the empennage work area 18. Accordingly, since the system cleans the exhaust air from the main-wing work area 6 and utilizes the heat retained in this exhaust air, the system can save consumption of energy needed for conditioning the temperature of the air to be fed to the empennage work area 18. Consequently, this empennage work area air conditioning device 52 may be of a compact, small-capacity type.

While the empennage area air vent opening 18 is disposed at an upper position in the empennage work area 18, the empennage area air inlet opening 57 for introducing the air in the empennage work area 18 is disposed at a lower position of the area 18 so as to be able to effectively achieve the improvement of the working environment. Further, the exhaust air which has been introduced from the empennage work area 18 through this air inlet opening 57 is cleaned by the above-described dry filter device 49 together with the exhaust air introduced from the main-wing work area 6 through the main-wing air inlet opening 48.

That is to say, after the exhaust air from the empennage work area 18 is cleaned by the dry filter device 49, a portion of this cleaned air is exhausted out of the system through the empennage area air exhaust passage 50 while the remaining portion of the cleaned air is recycled to the empennage area air conditioning device 52. With this, through the effective utilization of the heat remaining in the exhaust air from the empennage work area 18, the system can further save consumption of the energy needed for conditioning the air to be fed to the empennage work area 18.

In summary, the system of the present invention can save energy consumption in its air conditioning operation at each of the work areas 5, 6 and 18 through effective utilization of the heat remaining in the exhaust air. Accordingly, each of the air conditioning devices 24, 38 and 52 can be of a compact and small-capacity type. Consequently, the system can achieve significant conservation of energy in the entire hangar 1 as well as significant reduction in the entire system installation costs.

Like the inner wall 19 and the working table moving mechanisms 20, 21, 22 and 23 described hereinbefore, the right and left partition walls 46 each defining the main-wing area air inlet opening 48, the right and left dry filter devices 49 and the right and left empennage area air conditioning devices 52 are provided independently at the right and left sections 1*b* constituting the empennage area 1B. Accordingly, for moving the fuselage 2*a* and the main wing 2*b* into and out of the main area 1A, these right and left pairs of the partition walls 46, the dry filter devices 49 and the empennage area air conditioning devices 52 are moved independently together with each section 1*b*.

Figure 11:
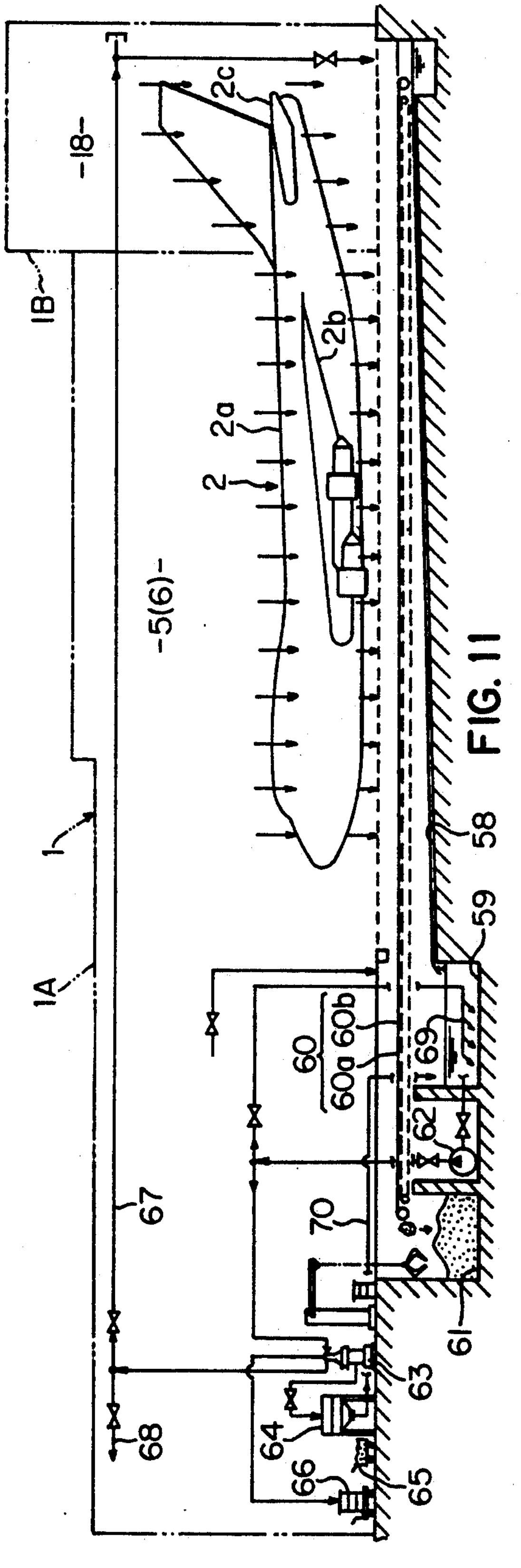
FIG. 11 is a system view of a drainage system.
Figure 3:
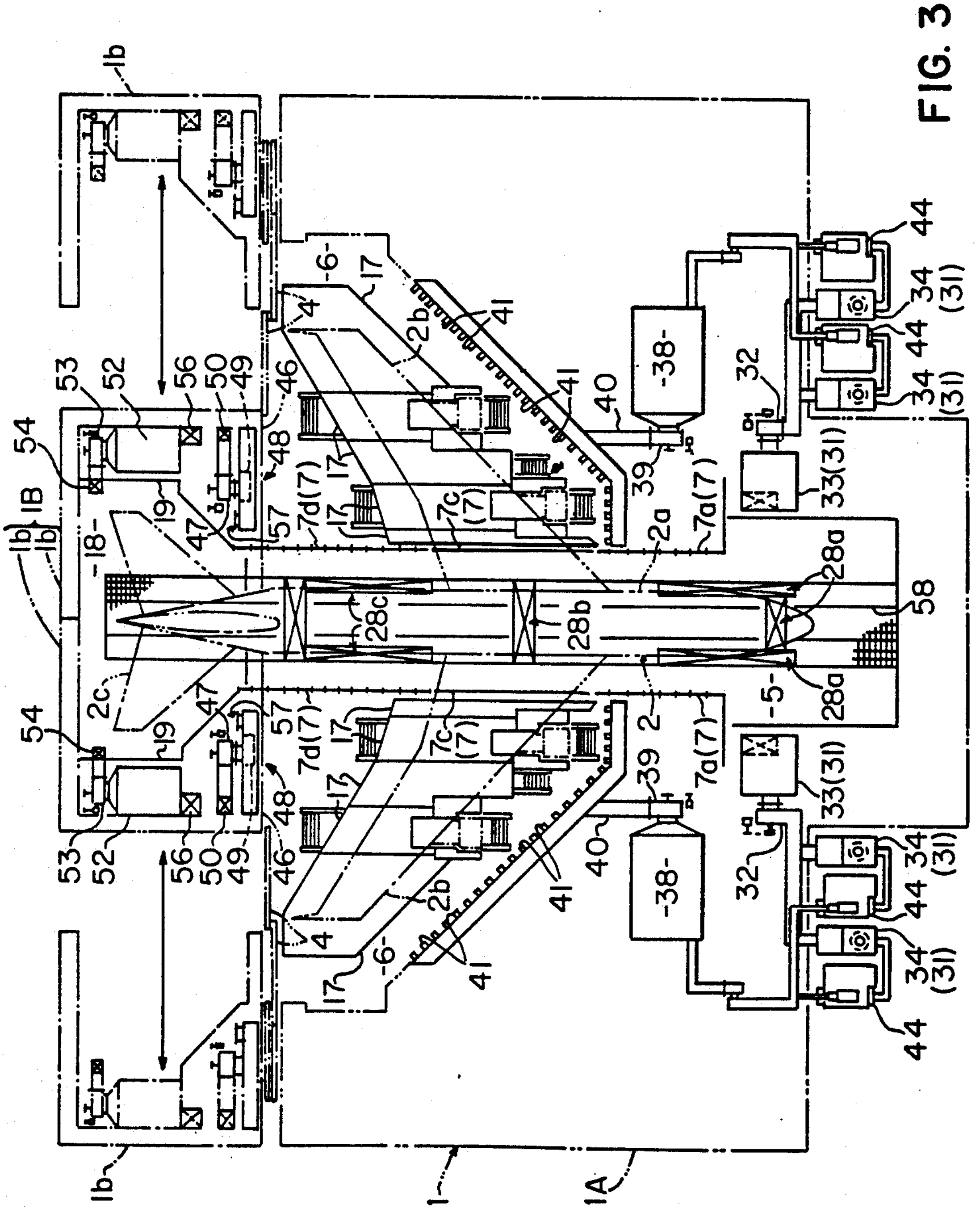
FIGS. 3 and 4 are plane views showing an interior construction of the hangar, respectively.
Figure 4:
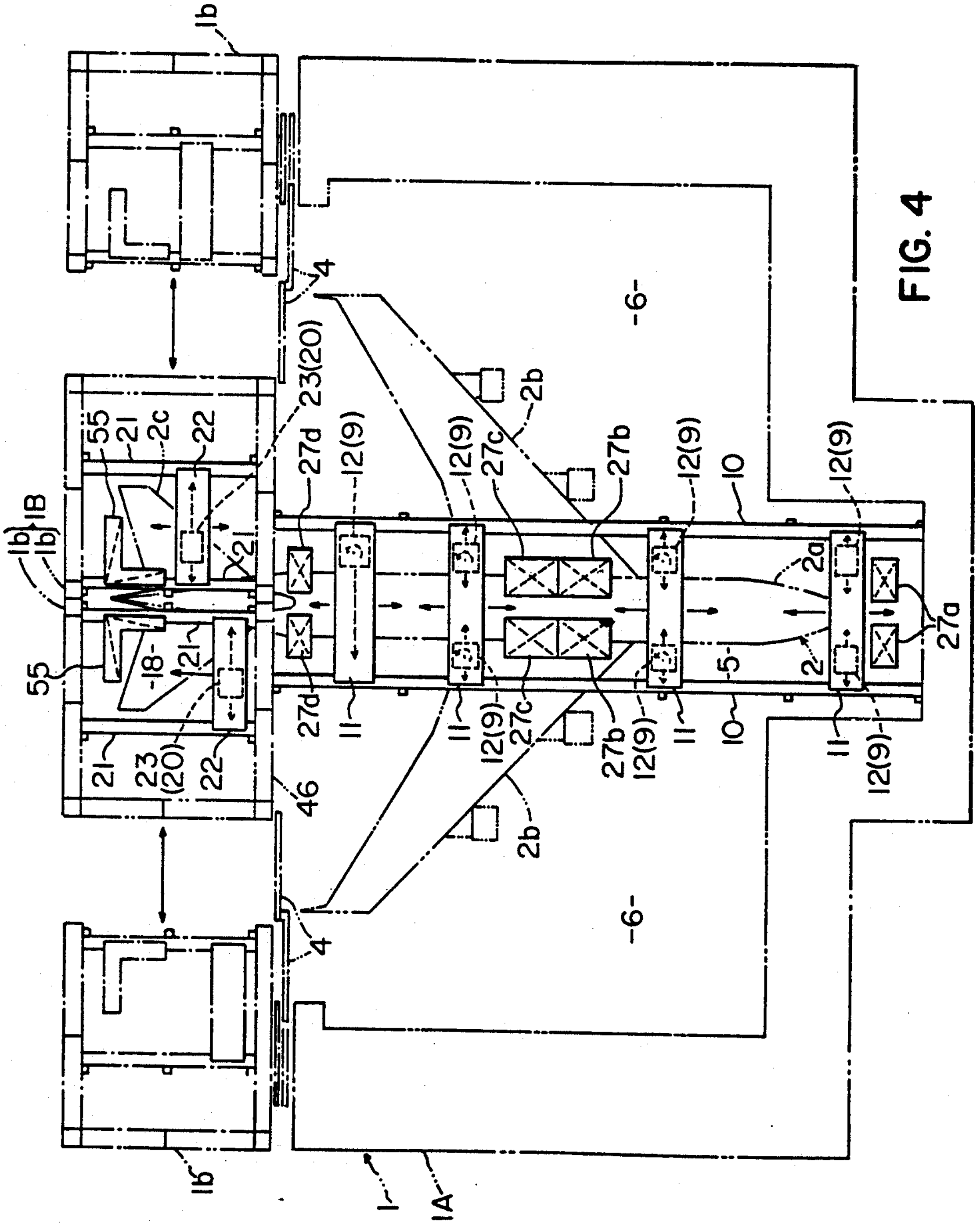
Figure 5:
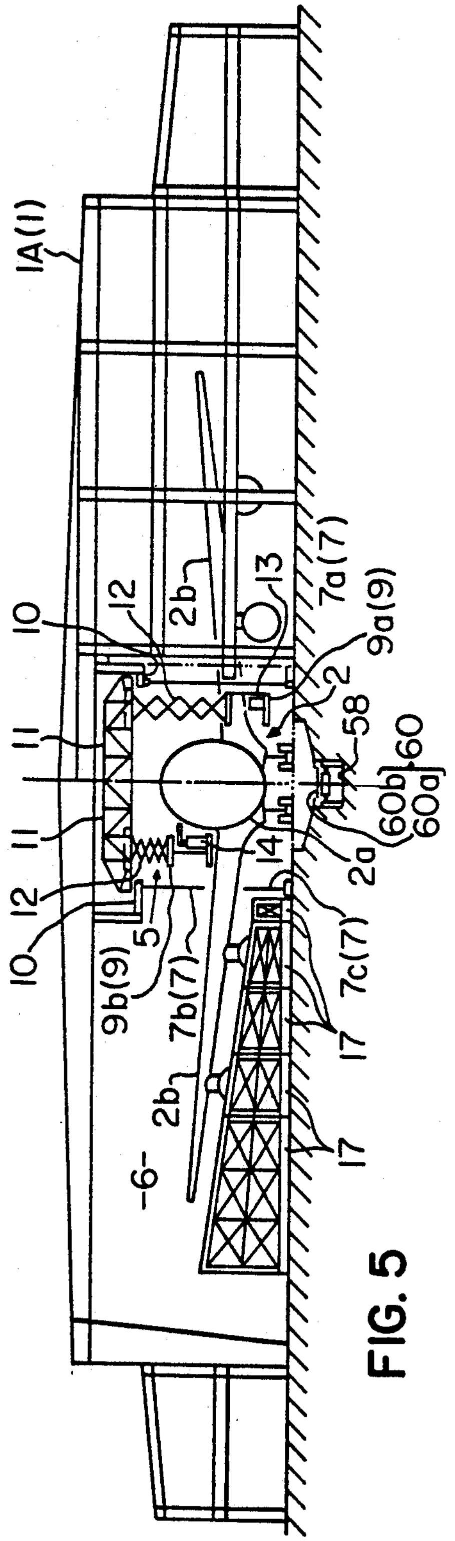
FIGS. 5 through 7 are sections, taken at longitudinal positions of a fuselage work area and of an empennage work area, respectively.
Figure 6:
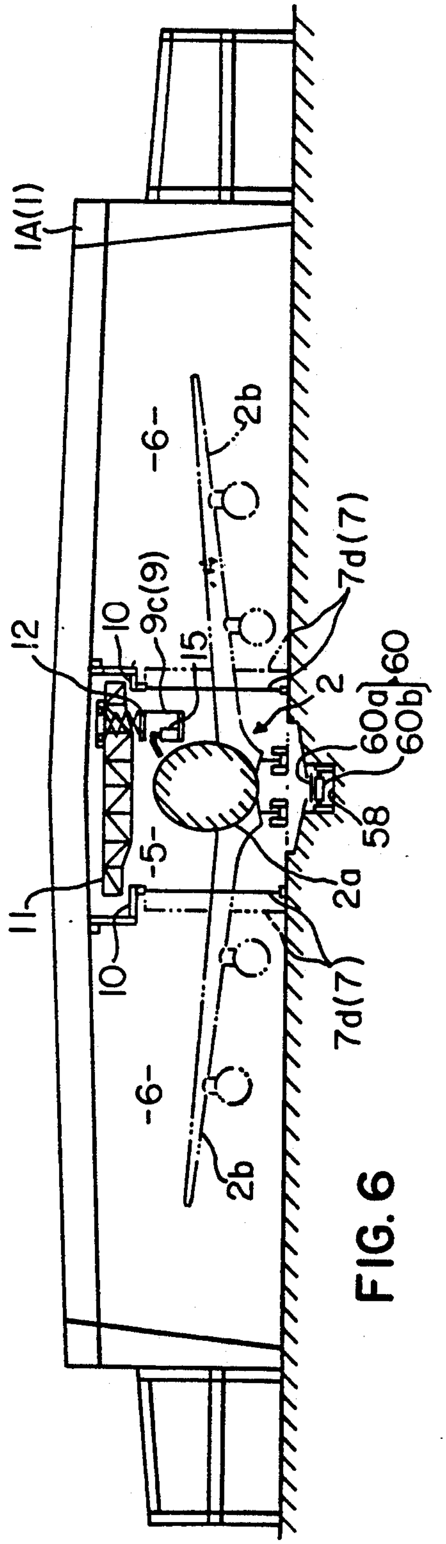
Figure 7:
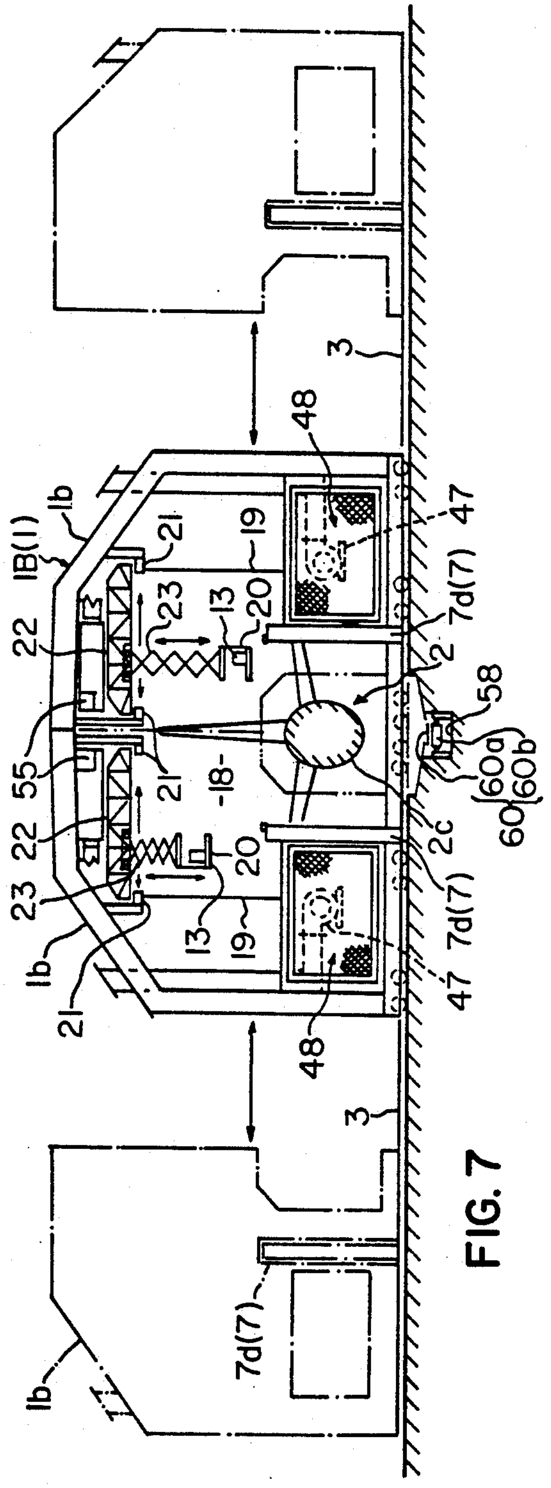

At the floor zones of the fuselage work area 5 and of the empennage work area 18, as shown in FIG. 11, there is provided one continuous paint-collecting gutter 58 extending from the front end of the fuselage work area 5 to the rear end of the empennage work area 18. More particularly, before a re-painting operation is effected on the fuselage 2*a* and the empennage 2*c*, the old paint on these aeroplane portions has to be peeled off by using a paint-peeling liquid and then the peeled paint sludge must be flushed away in cleaning water. For this purpose, the flush cleaning water is caused to flow at the paint-collecting gutter 58 and collected at a water tank 59 disposed at a downstream end of the gutter 58.

The above-described paint-collecting gutter 58 incorporates a sludge-collecting filter 60*a* extending through the entire length of the gutter 58, so that this filter 60*a* cleans the water running at the gutter 58 by filtering the sludge entrapped in the water.

A reference numeral 60*b* denotes an endless rotary device for moving the filter 60*a* along the length of the gutter 58. This endless rotary device 60*b* and the filter 60*a* together constitute a filter conveyor 60. Thus, the paint sludge collected by the filter conveyer 60 is conveyed on this conveyer and collected at a sludge tank 61. Thereafter, the collected sludge is appropriately disposed of by a sludge disposing system provided separately from the air conditioning system.

On the other hand, the cleaning water collected at the water tank 59 is conveyed by a pump 62 to a centrifugal-force separator 63, so that the separator 63 separates and eliminates any remaining paint sludge and oil substance contained therein. Then, this paint sludge separated by the separator 63 is dehydrated by a sludge filtering device 64 and then conveyed to the aforementioned sludge disposing system. Whereas, the oil substance separated also by the separator 63 is collected at a collector container 66.

A portion of the cleaning water having its paint sludge and oil substance eliminated by the separator 63 is fed through a recycling passage 67 to the upstream end of the paint-collecting gutter 58 to be re-used as the flush cleaning water at the gutter 58.

The remaining portion of the above cleaning water is conveyed through a water exhaust passage 68 to an exhaust water disposing system to be appropriately disposed of thereby.

The water tank 59 incorporates a nozzle device 69 for recycling by discharging a portion of the cleaning water pumped out by the pump 62 back into this tank 59. This water discharging operation by the nozzle device 69 stirs the tank water thus effectively preventing precipitation and accumulation of the sludge inside the tank 59.

A reference numeral 70 in the drawings denotes a water recycling passage for recycling the cleaning water collected from the paint sludge by the sludge filtering device 64 back to the water tank 59.

Some other embodiments of the invention will be specifically described next.

(A) In the foregoing embodiment, the collecting device for collecting the excess paint sludge trapped by the filter 60*a* comprises the filter conveyor 60 for collecting by conveying the sludge through the movement of the filter 60*a* per se. Instead, as this collecting device, any other types of collecting devices can be employed, such as one using a scraper member for scraping the sludge off the filter 60*a* or another using a movable suction member for sucking the sludge off the filter during its movement.

(B) In the foregoing embodiment, the cleaning liquid comprises water. Instead, the present invention is application to a situation where any liquid other than water is used as the cleaning liquid.

(C) In the foregoing embodiment, the sludge separating device (corresponding to the centrifugalforce separator 63 of the embodiment) is additionally provided for again cleaning the cleaning liquid which has had its paint sludge eliminated and trapped by the filter 60*a* incorporated in the collecting gutter 58. Alternately, in embodying the present invention, if the filter 60*a* of the gutter 58 alone provides sufficient sludge eliminating effect, the additional sludge separation by the sludge separating device and this device per se can be eliminated at all.

(D) In the third embodiment of the present invention where the cleaning liquid collected at the collecting gutter 58 is once cleaned and then recycled through the recycling passage 67 to the upstream end of the collecting gutter 58, the cleaning device (i.e. the centrifugal-force separator 63 in the above embodiment) can be of any one of various conventional types.

(E) The application of the cleaning system for use in treatment of excess paint relating to the present invention is not limited to that for an aeroplane hangar as disclosed. The invention's system will find applications in treatment of various objects.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cleaning system for use in treatment of excess paint, the system comprising:

a work area means for cleaning excess paint by trapping the excess paint in a cleaning liquid, a collecting gutter being provided in a floor of said work area, substantially directly underneath an object to be painted, for collecting the cleaning liquid containing the excess paint in the form of paint sludge;

a collecting device which includes a filter conveyor operable to collect the sludge, said filter conveyor including an endless rotary device and a winding type filter which is conveyed by and extends along said endless rotary device, wherein said winding type filter will filter and carry a portion of the paint sludge from the cleaning fluid collected in said collecting gutter;

said collecting device positioned within said collecting gutter including said winding type filter which filters the cleaning liquid introduced into the gutter; and a sludge tank positioned adjacent said filter conveyor of said collecting device for collecting the paint sludge carried by said winding type filter of said filter conveyor.

2. A system according to claim 1, further comprising:

a cleaning device for cleaning the cleaning liquid which has passed through said winding type filter of said filter conveyor and which is collected within said collecting gutter comprising means for removing paint sludge and an oil component from the cleaning liquid; and a recycling passage extending between said cleaning device and an upstream side of said collecting gutter for recycling a portion of the cleaning liquid cleaned by said cleaning device to said upstream end of said collecting gutter.

3. A system according to claim 2, wherein the object to be painted is an airplane and said work area installed with said collecting gutter comprises a work area for effecting works on the airplane.

4. A system according to claim 3, wherein the object to be painted is an airplane and said work area means includes a fuselage work area and an empennage work area, said collecting gutter extending from a front end of said fuselage work area to a rear end of said empennage work area.

5. A system according to claim 4, wherein said cleaning device comprises a centrifugal-force separator.

6. A system according to claim 5, wherein a remaining portion of said cleaning liquid, which has had the sludge and oil component thereof eliminated by said centrifugal-force separator, is conveyed through a liquid exhaust passage to an exhaust liquid disposing system to be appropriately disposed of thereby.

7. A system according to claim 6, wherein a liquid tank is disposed at a downstream end of said collecting gutter and adapted to receive the cleaning liquid which is collected within said collecting gutter, and a pump positioned between said liquid tank and said centrifugal-force separator, so that the cleaning liquid collected at said liquid tank is fed by said pump to said centrifugal-force separator.

8. A system according to claim 7, wherein said liquid tank incorporates a nozzle device which is coupled to said pump for recycling by discharging a portion of the cleaning liquid pumped out by said pump back into said liquid tank.

9. A system according to claim 8, further including a sludge filtering device coupled to said centrifugal-force separator for receiving paint sludge from said centrifugal-force separator, wherein the paint sludge separated by said centrifugal-force separator is dehydrated by said sludge filtering device.

10. A system according to claim 9, further including a second recycling passage extending between said sludge filtering device and said liquid tank wherein the cleaning liquid obtained by dehydration from the paint sludge at said sludge filtering device is recycled through said second recycling passage to said liquid tank.

11. A system according to claim 8, further including a collector container coupled to said centrifugal-force separator wherein the oil component separated by said centrifugal-force separator is collected within said collector container.

12. A cleaning system for use in the treatment of excess paint from the painting of airplanes, the system comprising:

a work area enclosing an airplane being painted, said work area provided with walls which define a fuselage work area and an empennage work area;

a collecting gutter provided in a floor of said work area positioned substantially directly underneath the airplane being painted and extending from a front end of said fuselage work area to a rear end of said empennage work area, wherein said collecting gutter receives cleaning liquid which has been directed over the airplane being painted and which contains excess paint in the form of paint sludge;

a collecting device positioned within said collecting gutter, said collecting device including a filter conveyor for filtering the cleaning fluid which is received in said collecting gutter, said filter conveyor includes an endless rotary device and a winding type filter which is conveyed by and extends along said endless rotary device, wherein said winding type filter will filter and carry a portion of the paint sludge from the cleaning fluid which is received in said collecting gutter;

a sludge tank positioned adjacent said filter conveyor and adapted to receive the paint sludge which is carried on said winding type filter;

a liquid tank positioned adjacent a downstream side of said collecting gutter and adapted to receive the cleaning liquid from said collecting gutter;

a centrifugal-force separator which cleans the cleaning liquid which is received in said liquid tank;

a pump which pumps the cleaning liquid from said liquid tank to said centrifugal-force separator;

a nozzle device positioned within said liquid tank and coupled to the outlet of said pump and provided to return a portion of cleaning liquid back to said liquid tank to stir the cleaning liquid within said liquid tank;

a first recycling passage extending from said centrifugal-force separator to an upstream side of said collecting gutter, said first recycling passage transporting a portion of the cleaning liquid which is cleaned by said centrifugal-force separator to said upstream side of said collecting gutter;

a liquid exhaust passage coupled to said first recycling passage and which transports the remaining portion of the cleaning liquid which is cleaned by said centrifugal-force separator;

a sludge filtering device coupled to said centrifugal-force separator and which receives and dehydrates paint sludge which has been separated from the cleaning liquid cleaned by said centrifugal-force separator;

a collector container coupled to said centrifugal-force separator and which receives an oil substance which has been separated form the cleaning liquid cleaned by said centrifugal-force separator; and a second recycling passage extending between said sludge filtering device and said liquid tank, said second recycling passage transporting fluid which is removed from the paint sludge in said sludge filtering device to said liquid tank.

* * * * *